(12) United States Patent
Buse et al.

(10) Patent No.: US 8,322,005 B2
(45) Date of Patent: Dec. 4, 2012

(54) WEATHER STRIP INSTALLATION DEVICE

(75) Inventors: Sorin Buse, Kitchener (CA); Dragos Racolta, Kitchener (CA); David Pow, Ingersoll (CA); John Szentimrey, London (CA); Andrew Farrow, London (CA)

(73) Assignees: Pow Specialty Equipment Inc., Ingersoll (CA); Toyota Motor Engineering & Manufacturing North America, Inc., Erlanger, KY (US)

( * ) Notice: Subject to any disclaimer, the term of this patent is extended or adjusted under 35 U.S.C. 154(b) by 965 days.

(21) Appl. No.: 12/256,817

(22) Filed: Oct. 23, 2008

(65) Prior Publication Data

US 2010/0101151 A1    Apr. 29, 2010

(51) Int. Cl.
*B23P 19/02*    (2006.01)
(52) U.S. Cl. ............... 29/235; 29/243.518; 29/281.1
(58) Field of Classification Search ............ 29/281.1, 29/451, 243.518; 269/26, 24, 22, 243.518, 269/235
See application file for complete search history.

(56) References Cited

U.S. PATENT DOCUMENTS

| | | | | |
|---|---|---|---|---|
| 2,761,199 A * | 9/1956 | Allen | ............... | 29/235 |
| 3,007,240 A * | 11/1961 | Heinrich | ............... | 29/235 |
| 3,044,431 A * | 7/1962 | Cummings | ............... | 269/34 |
| 3,284,886 A * | 11/1966 | Provencher | ............... | 29/235 |
| 3,307,249 A * | 3/1967 | Hohoff | ............... | 29/235 |
| 3,698,778 A * | 10/1972 | Townsend et al. | ............... | 312/1 |
| 3,896,655 A * | 7/1975 | Watson | ............... | 72/393 |
| 4,140,262 A * | 2/1979 | Wilson et al. | ............... | 228/49.3 |
| 4,148,125 A * | 4/1979 | Hanser | ............... | 29/451 |
| 4,172,313 A * | 10/1979 | Takahashi | ............... | 29/235 |
| 4,308,653 A * | 1/1982 | Hinton et al. | ............... | 29/235 |
| 4,528,736 A * | 7/1985 | Hope et al. | ............... | 29/235 |
| 4,578,851 A * | 4/1986 | Song | ............... | 29/235 |
| 4,620,354 A * | 11/1986 | Hess et al. | ............... | 29/417 |
| 4,635,335 A * | 1/1987 | Brown et al. | ............... | 29/235 |
| 4,653,166 A * | 3/1987 | Bright | ............... | 29/235 |
| 4,715,110 A * | 12/1987 | St. Angelo et al. | ............... | 29/701 |
| 4,760,636 A * | 8/1988 | St. Angelo et al. | ............... | 29/701 |
| 4,780,943 A * | 11/1988 | St. Angelo et al. | ............... | 29/235 |
| 4,782,573 A * | 11/1988 | Le Floch | ............... | 29/235 |
| 4,839,958 A * | 6/1989 | St. Angelo et al. | ............... | 29/450 |
| 4,843,701 A * | 7/1989 | St. Angelo et al. | ............... | 29/235 |

(Continued)

FOREIGN PATENT DOCUMENTS

EP            1502844            2/2005

(Continued)

*Primary Examiner* — Lee D Wilson
*Assistant Examiner* — Jamal Daniel
(74) *Attorney, Agent, or Firm* — Gifford, Krass, Sprinkle, Anderson & Citkowski, P.C.

(57) ABSTRACT

A weather strip installation device for mechanically installing weather strip along the opening of a vehicle door is disclosed. The device includes a frame outlining said opening, and a plurality of contact pads enclosing the frame. A selectively movable unit is disposed between the frame and the contact pads, wherein the selectively movable unit is operable to push each of the contact pads outwardly from the frame. In the first preferred embodiment the movable unit is a plurality of expandable bladders disposed between the contact pads and the peripheral edge of the frame. In the second preferred embodiment, the movable unit is an extensible arm rotatably attached to the frame. The extensible arm includes a roller disposed between the frame and contact pads that presses against the contact pads thereby installing the weather strip along the opening of the door as the extensible arm rotates about the frame.

11 Claims, 5 Drawing Sheets

U.S. PATENT DOCUMENTS

| | | | | |
|---|---|---|---|---|
| 4,852,240 A * | 8/1989 | St. Angelo et al. | | 29/559 |
| 4,897,913 A * | 2/1990 | St. Angelo et al. | | 29/450 |
| 4,996,756 A * | 3/1991 | Bright et al. | | 29/243.58 |
| 5,018,264 A * | 5/1991 | Kautt | | 29/564.8 |
| 5,020,278 A * | 6/1991 | St. Angelo et al. | | 49/490.1 |
| 5,029,381 A * | 7/1991 | St. Angelo et al. | | 29/701 |
| 5,031,293 A * | 7/1991 | Goedderz et al. | | 29/235 |
| 5,048,170 A * | 9/1991 | Kuppers | | 29/235 |
| 5,065,486 A * | 11/1991 | Goedderz | | 292/35 |
| 5,067,225 A * | 11/1991 | St. Angelo et al. | | 29/451 |
| 5,068,952 A * | 12/1991 | Hennen | | 29/235 |
| 5,103,547 A * | 4/1992 | Holloway et al. | | 29/451 |
| 5,115,551 A * | 5/1992 | Goedderz et al. | | 29/450 |
| 5,121,532 A * | 6/1992 | Massie | | 29/235 |
| 5,129,134 A * | 7/1992 | St. Angelo et al. | | 29/281.1 |
| 5,155,890 A * | 10/1992 | Goedderz | | 29/235 |
| 5,169,081 A * | 12/1992 | Goedderz | | 242/557 |
| 5,179,774 A * | 1/1993 | Massie | | 29/451 |
| 5,199,154 A * | 4/1993 | Mesnel et al. | | 29/451 |
| 5,201,106 A * | 4/1993 | Moore et al. | | 29/407.05 |
| 5,237,730 A * | 8/1993 | Goedderz | | 29/235 |
| 5,237,741 A * | 8/1993 | Goedderz | | 29/819 |
| 5,243,747 A * | 9/1993 | Mesnel et al. | | 29/243.58 |
| 5,274,895 A * | 1/1994 | Mesnel et al. | | 29/235 |
| 5,693,174 A * | 12/1997 | Nakata et al. | | 156/361 |
| 5,735,032 A * | 4/1998 | Stone | | 29/235 |
| 5,765,276 A * | 6/1998 | Pichot | | 29/717 |
| 5,779,830 A * | 7/1998 | Wakefield et al. | | 156/64 |
| 5,832,587 A * | 11/1998 | Uchiki et al. | | 29/451 |
| 6,205,651 B1 * | 3/2001 | Warner | | 29/706 |
| 6,311,378 B1 * | 11/2001 | Menguc | | 29/235 |
| 6,832,428 B2 * | 12/2004 | Miura et al. | | 29/450 |
| 6,874,218 B2 * | 4/2005 | Hicks et al. | | 29/450 |
| 7,055,228 B2 * | 6/2006 | Thommes et al. | | 29/235 |
| 7,478,466 B2 * | 1/2009 | Gratien et al. | | 29/450 |
| 7,748,094 B2 * | 7/2010 | Yamamoto et al. | | 29/235 |
| 8,052,818 B2 * | 11/2011 | Fenger | | 156/160 |
| 2005/0193544 A1 * | 9/2005 | Supina et al. | | 29/450 |
| 2006/0070224 A1 * | 4/2006 | Gratien et al. | | 29/451 |
| 2010/0101151 A1 * | 4/2010 | Buse et al. | | 49/493.1 |
| 2011/0308054 A1 * | 12/2011 | Bednarz et al. | | 29/235 |

FOREIGN PATENT DOCUMENTS

| | | |
|---|---|---|
| JP | 2003025933 | 1/2003 |
| JP | 2006131057 | 5/2006 |
| WO | WO-9105634 | 5/1991 |

* cited by examiner

WEATHER STRIP INSTALLATION DEVICE

BACKGROUND OF THE INVENTION

1. Field of the Invention

A system for mechanically installing weather strip along the opening of a vehicle door.

2. Description of the Prior Art

Weather strip is used to line the opening of a vehicle door to provide a seal between the door and the door frame. Accordingly, vehicle door openings are equipped with a lining for which weather strip may be fixed thereto. In the earlier stages of vehicle manufacturing, an assembly worker physically inserted the weather strip into the lining along the opening of the door. This process was time consuming, but was necessary as weather stripping is a pliable material susceptible to tear. Accordingly systems to automate the installation of weather stripping along the opening of a door were devised that were able to handle and manipulate weather strip without tearing it.

Mechanical weather strip installing devices are known, used and well documented. For instance, U.S. Pat. No. 5,020,278 to St. Angelo, Jr. et al. discloses an apparatus for installing weather stripping in a door using a robot with an end effecter. The end effecter has a gripper which grabs the weather strip from the post on which it is hung and then a roller, the roller being placed on the weather strip and rolled onto the weather strip such that the weather strip is pressed into the opening aligning the door.

U.S. Pat. No. 5,237,730 to Goedderz discloses a robot arrangement for mounting weather strip within the opening of a car door. The robot has a robotic arm with an end effecter having a spigot mounted on a pivotable finger. The strip is mounted within the door frame. The finger pivots and constrains the strip to follow a curved path around a guide roller. The robotic arm continues to trace the outline of the door frame opening until the weather strip is completely inserted.

Both St. Angelo, Jr. et al. and Goedderz disclose the use of a robot having an arm with an end effecter designed to place the weather strip into position along the opening of a door and both require that the robot be able to trace the circumference of the door in order to ensure that the application of a weather strip is done properly. This requires added sensors enabling the robot to detect the path along the opening of a vehicle door and increases manufacturing costs. Furthermore, weather strip installation is subject to error when the sensor fails to lead the robotic arm accurately along opening of the door and the weather stripping itself is prone to tear by the robotic gripper which handles the weather strip. Accordingly it is desirable to have a system which does not rely upon sensors to detect the opening of a door while still maintaining the ability to place the weather strip accurately within the door without tearing the weather strip.

SUMMARY OF THE INVENTION AND ADVANTAGES

A weather strip installation device for mechanically installing weather strip along the opening of a vehicle door is provided. Specifically the device includes a frame with a peripheral edge outlining the opening of a vehicle door, and a plurality of contact pads supported by links pivotably coupled together to enclose the frame. A selectively movable unit is mounted to the peripheral edge of the frame, wherein the selectively movable unit is operable to press each of the plurality of contact pads against the weather strip thereby installing the weather strip along the opening of the vehicle door.

In the first preferred embodiment the movable unit is a plurality of expandable bladders disposed between the contact pads and the peripheral edge of the frame. The expandable bladders are individually supplied air by an air pump via a hose. The expandable bladders are sequentially expanded against the pivotally joined sections of each link thus forcing the contact pads against the weather strip in an undulating motion.

In the second preferred embodiment, the movable unit is an extensible arm rotatably attached to the frame. The extensible arm includes a roller disposed between the peripheral edge of the frame and the plurality of contact pads. The extensible arm moves the roller along a path defined by the opening of the door and presses the roller against each of the plurality of contact pads thereby installing the weather strip along the opening of the door

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
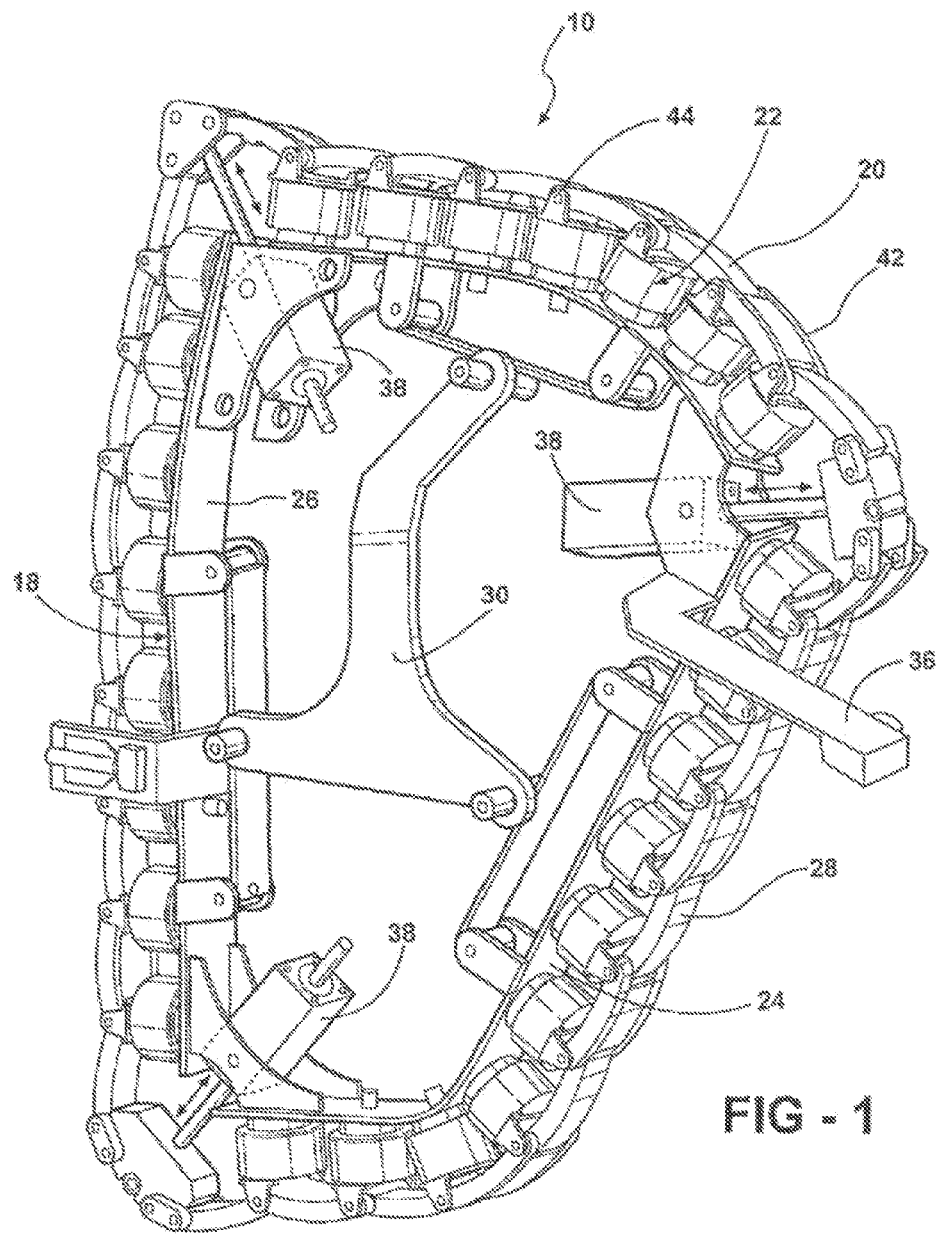
FIG. 1 is a perspective view of the first preferred embodiment of the weather strip installation device.

Referring to the Figures, wherein like numerals indicate corresponding parts throughout the several views, a weather strip installation device 10 for installing weather strip 12 along the opening 14 for a vehicle door is provided wherein the opening 14 has a lining 16 for receiving the weather strip 12. The weather strip installation device 10 is particularly useful for expediting the manufacturing process of a vehicle. The weather strip installation device 10 includes a frame 18 for supporting the device within the opening 14, contact pads 20 enclosing the frame 18, and a selectively movable unit 22 for engaging the contact pads 20 outwardly from the frame 18, pressing the contact pads 20 against the weather strip 12 thereby fixing the weather strip 12 into the lining 16 of the opening 14.

The frame 18 includes a peripheral edge 24 defining an inner circumference 26 and may be stamped out of steel, a steel composite, or other such material having structural strength to withstand the pressing forces of the device. A plurality of contact pads 20 are spaced apart from the peripheral edge 24 and arranged adjacent to each other to enclose the frame 18. The contact pads 20 may be made of a hardened polymer or other similar material and have an arced surface 28 to allow the contact pad 20 to roll against the weather strip 12. A frame support 30 extends across the inner circumference 26 of the frame 18 to help the frame 18 maintain its shape when the selectively movable units 22 push the contact pads 20 outwardly from the peripheral edge 24.

The frame 18 may further include an extendable frame arm support 32 for supporting the weather strip installation device 10 on a platform 34 of a work station in a manufacturing line. Specifically, the frame arm support 32 may be attached to the frame 18 on one end and a platform 34 of a manufacturing workstation at the other end. Thus, as the vehicle is moved down the assembly line, the weather strip installation device 10 may be positioned from the platform 34 into the vehicle opening 14.

Once positioned within the opening 14 for the vehicle door, it is helpful in the operation of the device to have features which stabilize the weather strip installation device 10 therein. Accordingly, the frame 18 may further include a bracing arm 36 and extendable members 38 to help secure the weather strip installation device 10 within the opening 14 of the vehicle door. The bracing arm 36 extends outwardly from the frame 18 and engages a door mounting structure (not shown) adjacent the opening 14 of the vehicle door, such as a door hinge or a striker, thereby bracing the weather strip installation device 10 within the door opening 14. Each of the extendable members 38 is attached to one of the plurality of contact pads 20. The extendable member 38 presses the attached contact pad 20 against the opening 14 of the door to help farther secure the device within the opening 14.

A plurality of paired links 42 pivotably coupled together encloses the frame 18. The selectively movable unit 22 is disposed between the peripheral edge 24 of the frame 18 and the contact pads 20. As the selectively movable unit 22 engages the contact pads 20, the paired links 42 limits the movement of the contact pads 20 and enables the device to operate in an undulating manner. Thus, the paired links 42 not only provides support for the contact pads 20, but also helps control the movement of the contact pads 20.

Figure 3:
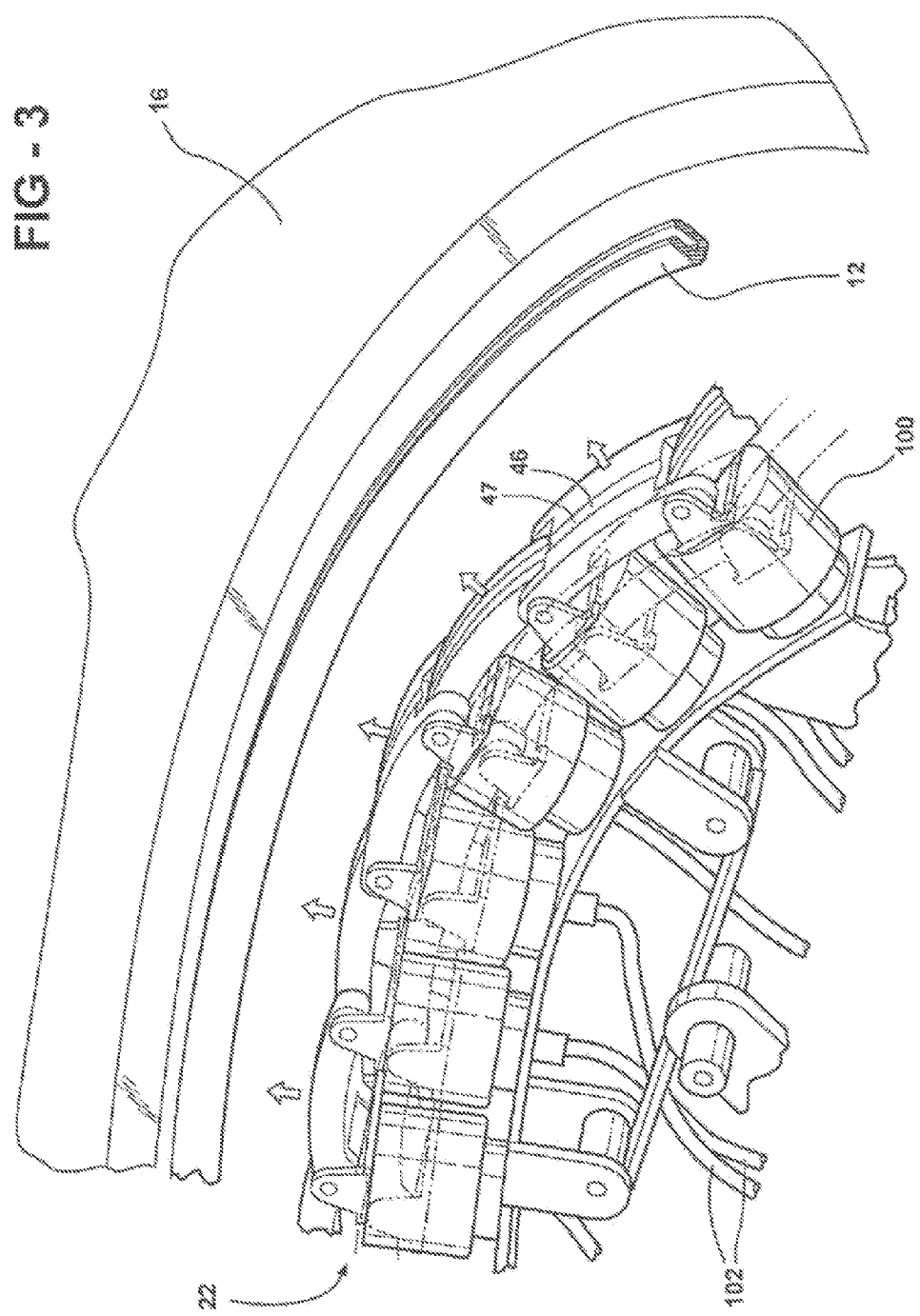
FIG. 3 is an exploded view of the first preferred embodiment of the weather strip installation device

With reference to FIGS. 1 and 3, each of the paired links 42 is spaced apart from the other, and a contact pad 20 is disposed between the pair links. The paired links 42 are pivotably coupled together with a pin 44. FIG. 3 also show each of the plurality of contact pads 20 having a centering feature 46. The centering feature 46 helps ensure that the contact pads 20 are pressing the weather strip 12 against the lining 16 of the vehicle door. FIG. 3 shows the centering feature 46 being a groove 47 extending along the exterior surface of the contact pad 20 because the lining 16 of the opening 14 door is in the shape of a ridge. However, the shape of the centering feature 46 is shown for illustrative purposes only and is not limiting. It is understood that the centering feature 46 may be shaped otherwise, for instance where the lining 16 of the opening 14 is a groove; the centering feature 46 may be shaped as a ridge thereby centering the contact pad 20 onto the lining 16.

With reference now to FIGS. 1 and 3, the first preferred embodiment of the weather strip installation device 10 is shown wherein the selectively movable unit 22 is a plurality of expandable bladders 100 disposed between the contact pads 20 and the peripheral edge 24 of the frame 18. The expandable bladders 100 may be composed of a polymer or other material having an elastic property. The bladders 100 are attached to where the paired links are pivotably coupled together by a bracket 48. As each bladder 100 is expanded, the paired links 42 are pushed outwardly where the paired links 42 are coupled together, causing the contact pad 20 disposed therebetween to press the weather strip 12 into the vehicle lining 16. After the bladders 100 are expanded to a certain dimension, they are deflated and the paired links 42 return to their resting position. The bladders 100 may be expanded with air. Specifically, each bladder 100 has a hose 102 attached thereto and may be expandable by an air gun (not shown). The air gun is operable to expand each bladder 100 individually and the plurality of expandable bladders 100 sequentially. Thus the weather strip installation device 10 provides for an undulating motion of the contact pads 20 as the bladders 100 are sequentially inflated and deflated.

Figure 2:
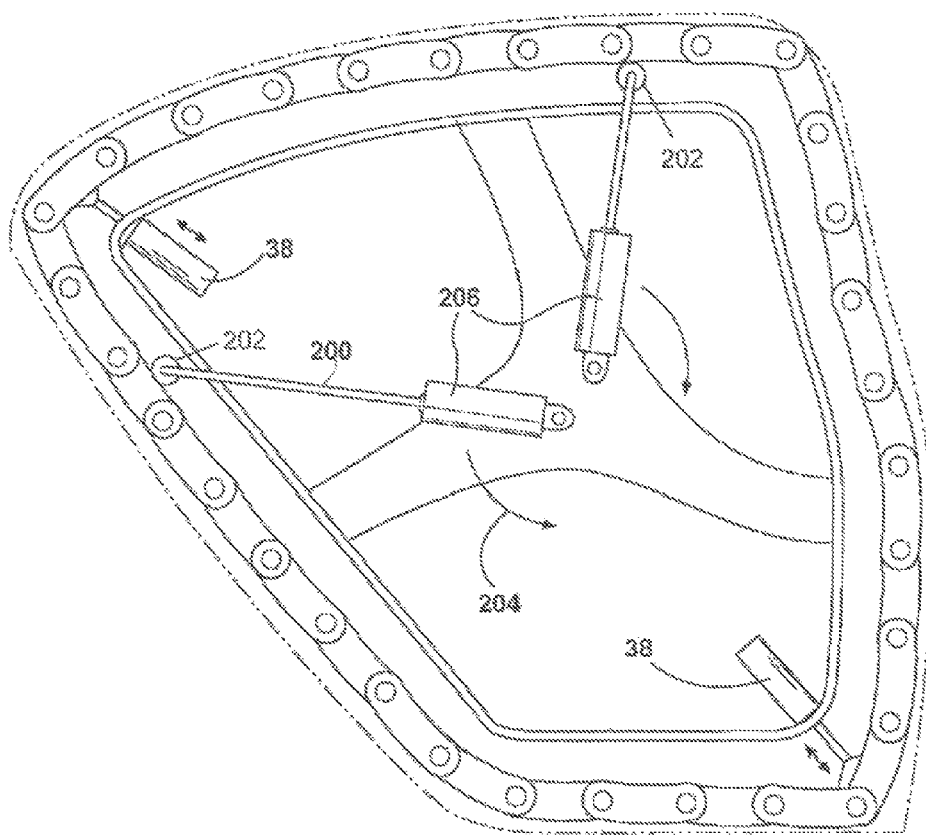
FIG. 2 is a perspective view of the second preferred embodiment of the weather strip installation device.

With reference now to FIG. 2, the second preferred embodiment of the weather strip installation device 10 is shown wherein the selectively movable unit 22 is an extensible arm 200 having a roller 202 disposed between the peripheral edge 24 of the frame 18 and the plurality of contact pads 20. The extensible arm 200 is rotatably attached to the frame 18 on one end and extends to the roller 202. The extensible arm 200 is moveable along a path 204 defined by the opening 14 of the door and pressing the roller 202 against each of the plurality of contact pads 20 thereby installing the weather strip 12 along the opening 14 of the door. The extensible arm 200 further includes a piston 206. The piston 206 operable to maintain a predetermined amount of on the contact pads 20 via the roller 202. As shown in FIG. 2, the displacement of the roller 202 with respect to where the extensible arm 200 is rotatably attached to the frame 18 varies depending upon where the roller 202 is within the path 204 of travel. Accordingly, the piston 206 provides the extensible arm 200 with a means of expanding and contracting (as shown by the arrows) allowing the roller 202 to maintain a predetermined amount of force on the contact pads 20 sufficient to install the weather strip 12 into the lining 16 of the vehicle opening 14.

Figure 4:
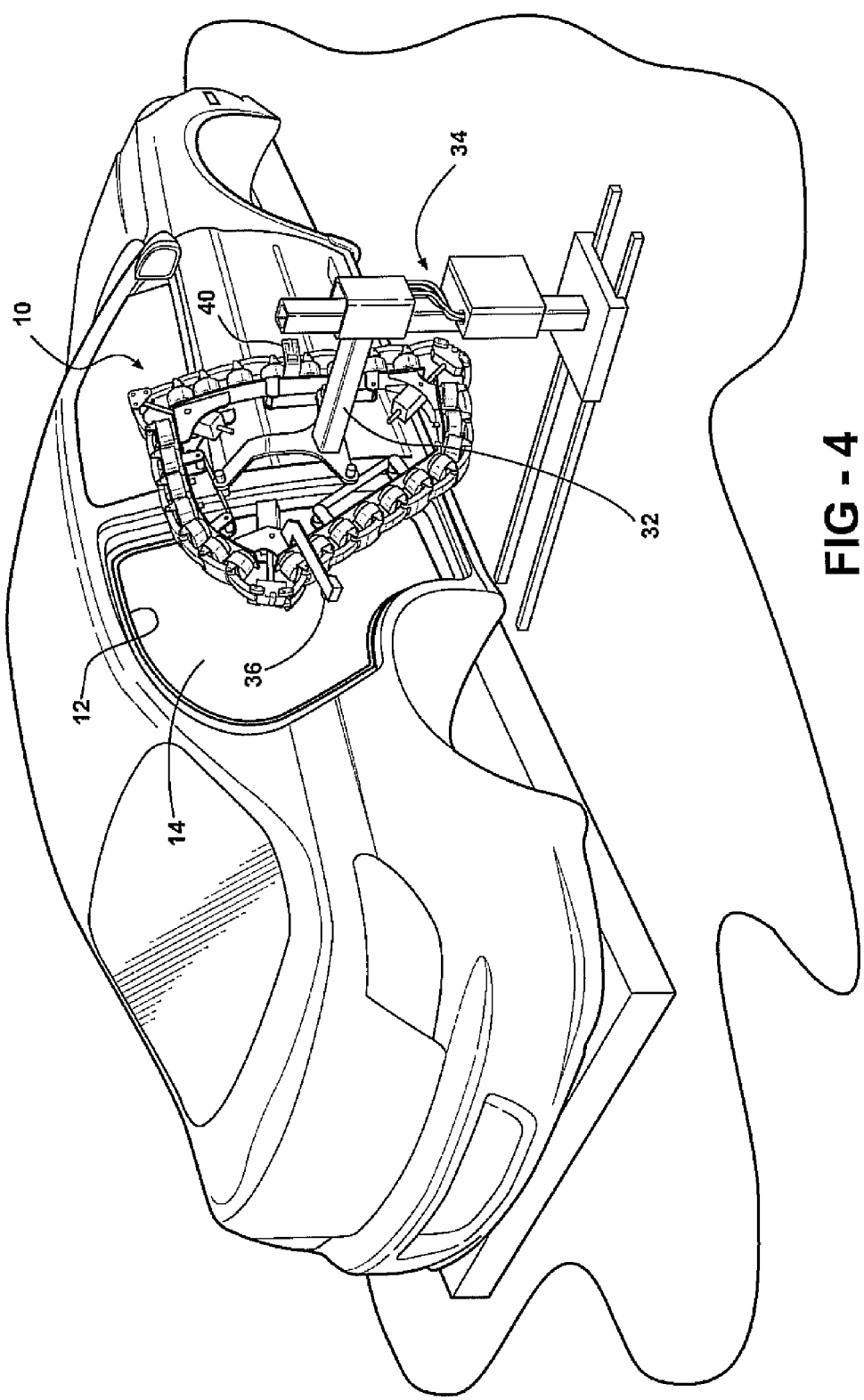
FIG. 4 is a perspective view of the first preferred embodiment of the weather strip installation device attached to the platform of an assembly station whereby a vehicle is positioned to receive the weather strip.
Figure 5:
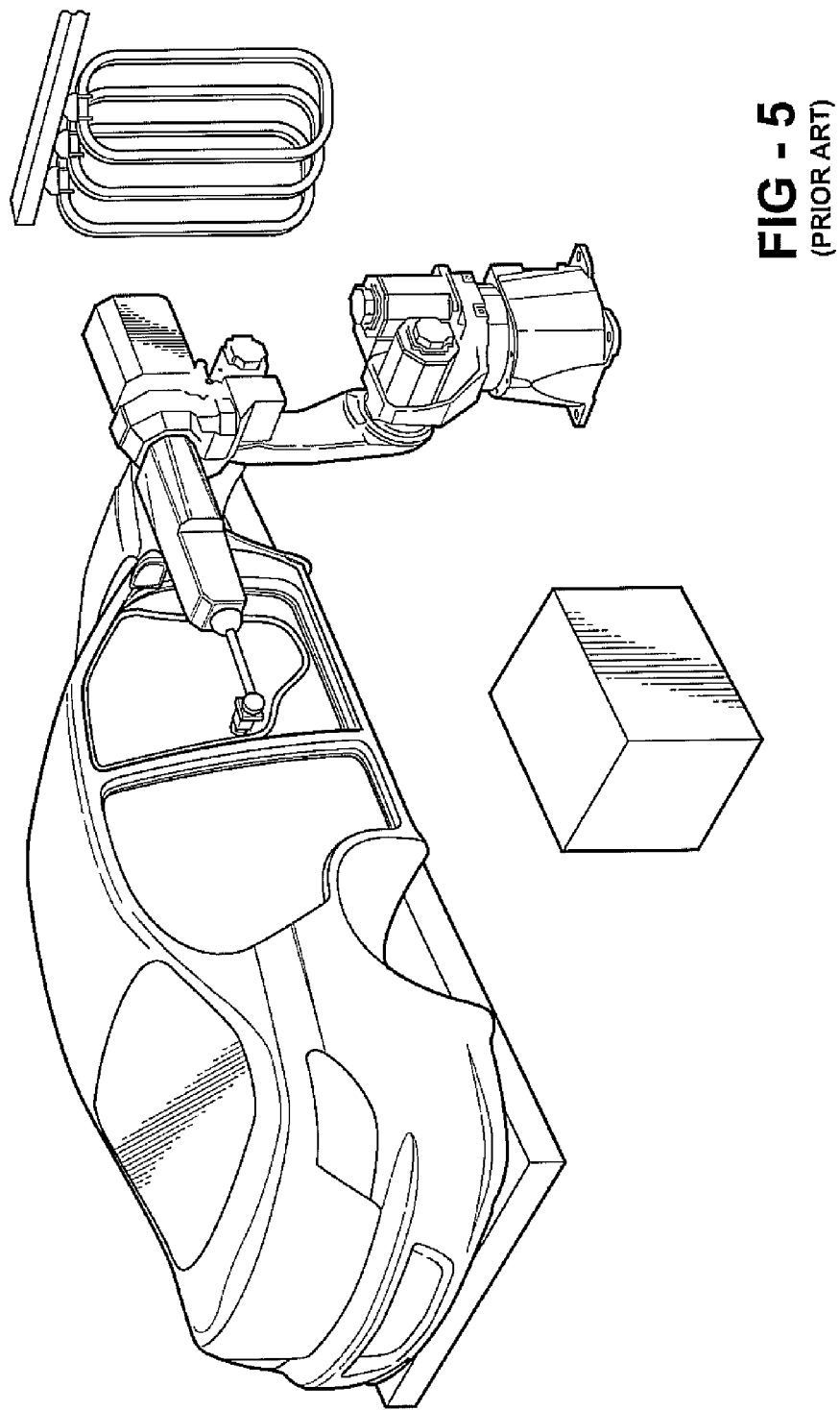
FIG. 5 is a perspective view of a weather strip installation system of the prior art.

With reference now to FIG. 4, the weather strip installation device is shown as part of an assembly station. The weather strip installation device 10 is particularly useful in the mass manufacturing of vehicles as its use is quicker and more efficient than manual means. Specifically, mass manufacturing of vehicles are done in an assembly line and the weather strip 12 device may be implemented in a station of the manufacturing process. Typically, the vehicles are moved from station to station along a conveyor line. When the vehicle is moved to the station with the weather strip installation device 10, an assembly worker can simply push the device into the opening 14 for the vehicle door. The worker then positions the bracing arm 36 to engage the door mounting structures adjacent the opening 14 such as the door hinge or the striker, thereby securing the device to the opening 14. The extendable members 38 can then extend outwardly to push predetermined contact pads 20 against the door opening 14 further stabilizing the device for subsequent operation. Once the device has been secured within the opening 14 in the described manner, the selectively movable unit 22 is made operable to push the contact pads 20 into the weather strip 12. As stated above this can be done in a sequential manner as to present an undulating motion. When the weather strip 12 has been installed, the extendable members 3 8 retract disengaging the predetermined contact pads 20 from the opening 14. The assembly worker can then disengage the bracing arm 36 from the door mounting structure and the vehicle is then free to proceed to the next station of the manufacturing line. Thus a weather strip installation device 10 is provided that provides for an efficient means for installing weather strip 12 in the opening 14 for a vehicle door.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A weather strip installation device for installing weather strip along the opening of a vehicle door, the opening including a lining for receiving the weather strip, the weather strip installation device comprising:
   a frame having a peripheral edge, said frame for supporting the device within the opening of the vehicle door;
   a plurality of contact pads enclosing said frame; and
   a plurality of paired links pivotably coupled together and enclosing said frame, said plurality of paired links supporting each of said plurality of contact pads, wherein each one of said plurality of paired links is spaced apart from the other, and each one of said plurality of contact pads is disposed between each of said paired links to enclose said frame;
   a selectively movable unit mounted to the peripheral edge of the frame, wherein said selectively movable unit pressing each of said plurality of contact pads against the weather strip thereby installing the weather strip along the opening of the vehicle door.

2. A device as set forth in claim 1 wherein said frame defining an inner circumference and said frame including a frame support extending across said inner circumference of said frame to help the frame maintain its shape.

3. A device as set forth in claim 1 wherein each of said plurality of contact pads having a groove extending along the exterior surface of the contact pad, wherein the groove centers the weather strip along the opening of the vehicle door.

4. A device as set forth in claim 1 wherein each of said plurality of contact pads are arranged adjacent to each other.

5. A device as set forth in claim 1 wherein said frame further including a bracing arm disposed, said bracing arm extending outwardly from said frame and engaging a door mounting structure adjacent the opening of the vehicle door, such as a door hinge or a striker, thereby bracing said weather strip installation device within said door opening.

6. A device as set forth in claim 5 further wherein said selectively movable unit being a plurality of expandable bladders disposed between said contact pads and said peripheral edge of said frame, wherein each of said plurality of expandable bladders pressing said plurality of contact pads against said weather strip thereby installing said weather strip along the opening of the vehicle door.

7. A pressing system as set forth in claim 6 wherein each of said plurality of expandable bladders are adjacent to the other and said plurality of expandable bladders are sequentially expandable such that each of said plurality of bladders expand and deflate in an undulating manner.

8. A device as set forth in claim 5 wherein said selectively movable unit being an extensible arm having a roller disposed between said peripheral edge of said frame and said plurality of contact pads, said extensible arm rotatably attached to said frame, wherein said extensible arm is moveable along a path defined by said opening of said door and pressing said roller against each of said plurality of contact pads thereby installing said weather strip along the opening of said door.

9. A device as set forth in claim 8 wherein said extensible arm further including a piston, said piston pressing said roller against said plurality of contact pads as said extensible arm travels along said path thereby installing said weather strip along said opening of said door.

10. A device as set forth in claim 5 wherein said frame further including a plurality of extendable members, each of said plurality of extendable members attached to one of said plurality of contact pads and pressing said one of said plurality of contact pads against the opening of said door to help secure said device within said opening.

11. A device as set forth in claim 5 wherein said frame further including a frame arm support for supporting the device in such a manner as to facilitate the placement of the device within the opening of the vehicle door.

* * * * *